United States Patent Office 3,793,344
Patented Feb. 19, 1974

3,793,344
PROCESS FOR MAKING 2,3-DIHYDRO-p-OXATHIINS AND THEIR SULFOXIDES AND SULFONES
Friedrich Asinger, Aachen, Paul Scherberich, Neu-Isenburg, and Heribert Offermanns, Grossauheim, Germany, assignors to Deutsche Gold- und Silber-Scheideanstalt vormals Roessler, Frankfurt am Main, Germany
No Drawing. Filed Nov. 17, 1970, Ser. No. 97,403
Claims priority, application Germany, Nov. 18, 1969,
P 19 57 859.7
Int. Cl. C07d 89/14
U.S. Cl. 260—327 P                                    10 Claims

ABSTRACT OF THE DISCLOSURE 2,3-dihydro-p-oxathiins are made by reacting an α-mercaptooxo compound or a dimer thereof with an equimolar amount of an oxirane in the presence of an inert organic solvent and in the presence of a base at a temperature between about 0 and 100° C. so as to form the corresponding alkoxylated α-mercaptooxo compound and then subjecting the latter compound to cyclization in the presence of an inert solvent and an acid catalyst or by reaction with an equimolar amount of anhydrous zinc chloride or phosphorus pentoxide. The thus-obtained 2,3-dihydro-p-oxathiin may then be oxidized to the sulfone or sulfoxide.

The compounds of the invention are valuable as antioxidants for use in synthetic materials and elastomers. The process permits obtaining of the product at high yields and at a high rate of purity.

BACKGROUND OF THE INVENTION

It has been proposed to make 2,3-dihydro-p-oxathiins by reaction of α-halogeno ketones or α-hydroxy ketones with thioglycol (J. Chem. Soc. 1959, p. 2360). These methods can also be employed to make 2,3-dihydro-5-carboxamido-6-methyl-1,4-oxathiins starting from α-chloro acetic acid ester and thioglycol (U.S. Pat. No. 3,249,499). However, this process has the shortcoming that the halogeno-ketones are available only to a limited extent and that usually the yield of this process is poor.

It has also been suggested that α-mercapto ketones may be reacted with ethylene oxide to form β-hydroxyethyl-mercapto-ketones, and that the product may be subjected to cyclization. However, the process for making specific reaction products, and in particular reaction products on the basis of other functional groups containing oxiranes and subsequent cyclization, has never been disclosed and there has never been, in so far as applicants are aware, a statement of specific reaction conditions and yields and, in particular, the possibility to obtain a specific broad range of final products.

SUMMARY OF THE INVENTION

The present invention resides in a process whereby any desired type of 2,3-dihydro-p-oxathiin may be obtained by reacting an α-mercaptooxo compound or a dimer thereof with an equimolar amount of an oxirane in the presence of an inert organic solvent and in the presence of a base at a temperature between about 0 and 100° C. There is thus formed an alkoxylated α-mercaptooxo compound which is then subjected to cyclization, for instance, in the presence of an inert solvent and an acid catalyst or by reaction with an equimolar amount of anhydrous zinc chloride or phosphorus pentoxide.

DETAILED DESCRIPTION OF THE INVENTION AND OF SPECIFIC EMBODIMENTS

The reaction of the present invention in the first stage involves the reaction between an α-mercaptooxo compound and an oxirane. This is followed by dehydration of the formed alkoxylated α-mercaptooxo compound. The first stage reaction of the mercaptooxo compound with the oxirane preferably is carried out at a temperature between about 25 and 30° C. It is not necessary then in all cases to isolate the obtained alkoxylated α-mercaptooxo compound. However, this may be done and the product may be subjected to a purification prior to the subsequent cyclization.

The process of the invention permits to obtain 2,3-dihydro-p-oxathiins and the corresponding sulfones and sulfoxides, all of which are illustrated by the following formulae

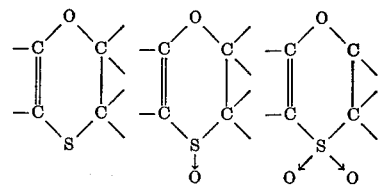

The products are obtained at a high yield and with a high degree of purity.

The inert solvents for the reaction between the α-mercaptooxo compound and the oxirane may for instance be hydrocarbons such as benzene, toluene, xylene, furthermore dioxane, tetrahydrofuran, chloroform, ether, dimethylformamide, etc. The use of alcohols is particularly desirable. Among them methanol is preferred.

The basic catalysts for the alkoxylation may be bases like alkali hydroxides, particularly potassium hydroxide, alcoholates, carbonates, bicarbonates, organic bases such as tertiary amines or pyridine or quaternary nitrogen bases. These catalysts may be used in amounts from 0.5 to 10% by weight, preferably from 1 to 2% by weight relative to the α-mercaptooxo compound.

As α-mercaptooxo compounds all compounds can be used in the process which include the structural element

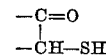

These may in particular be compounds of the formula

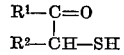

$R^1$ and $R^2$ in this formula are the same or different and are hydrogen, alkyl of 1-18 carbon atoms, aryl, aralkyl, heteroalkyl, —COOH or —COOR. $R^1$ may also form a ring with $R^2$ of 4–12 members which may in addition include an O-, S-, N- or P-atom. The groups just listed may also be substituted by halogen, particularly chlorine, or —CN, —COOR, —OR, —SR,

or —OH groups. In all these groups R may be alkyl with 1–12 carbon atoms. $R^1$ and $R^2$ may also be —COOMe, —CONRR, —CONHR and —CONH$_2$ in which case Me is an alkali metal atom, particularly sodium.

As examples of these α-mercaptooxo compounds there may be mentioned: mercaptobutanones, mercaptopentanones, mercaptoacetone, mercaptocyclohexanone, mercaptocyclooctanone, mercaptocyclododecanone, mercaptoacetophenone, mercaptopyruvic acid ester, mercaptomethylbenzylketone, and mercaptoacetylacetic acid ester.

As oxiranes all compounds may be used which include the structural elements

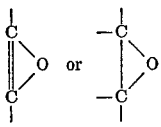

Examples of such compounds are those having the formula

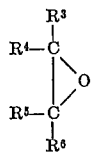

$R^3$, $R^4$, $R^5$ and $R^6$ in this formula are the same or different and are hydrogen or halogen, particularly chlorine, or are a CN-group or alkoxyl, alkyl or alkenyl, all of which groups have 1–18 carbon atoms. The groups may be straight linear or branched, and also may be interrupted in one or several places by

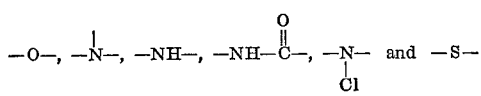

The alkyl or alkenyl groups may also be substituted by one or several of the following groups: —OH, —NO$_2$, —CN, —OC$_6$H$_5$, —OC$_6$H$_4$-allyl, —SCN, —S-alkyl and —SH groups, or they may be substituted by halogen, particularly chlorine. They may furthermore be aryl, particularly phenyl, which in turn may be substituted by NO$_2$, or they may be aralkyl or pyridyl or phthalimide in which cases these groups may be attached to the oxirane ring by an alkylene group, particularly methylene, or by —NH—. These groups may also be substituted by halogen.

The compounds useful for this purpose may also include keto groups of the following structures

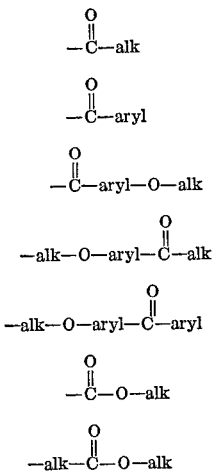

or the groups

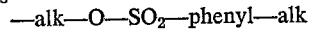

and

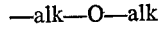

where alk identifies alkyl or alkenyl, preferably having 1–6 carbon atoms and aryl preferably is phenyl. Phosphite and phosphoric acid ester groups may also be included in these compounds, which groups may be attached to the ring directly or through methylene. $R^3$ and $R^5$ or $R^4$ and $R^6$ may also together form a closed ring. Examples are for instance cycloalkyl rings of 4–12 members. These compounds include also epoxydated fatty acids and esters thereof.

As examples of these compounds there may be mentioned the following:

ethylene oxide,
propylene oxide,
1,2-butylene oxide (ethylethylene oxide),
2,3-butylene oxide (1,2-dimethylethylene oxide),
hydroxymethylethylene oxided(glycidol),
dimeric glycidol,
1,1-dimethylethylene oxide,
1-methyl-2-ethylethylene oxide,
trimethylethylene oxide,
tetramethylethylene oxide,
1-methyl-2-propylethylene oxide,
1-methyl-2,2-diethylethylene oxide,
1,1-dimethyl-2-ethylethylene oxide,
1,2-dimethyl-1-ethylethylene oxide,
1,1-diethylethylene oxide,
1-methyl-2-propylethylene oxide,
1-methyl-1-isopropylethylene oxide,
1-methyl-2-isopropylethylene oxide,
isopropylethylene oxide,
1-methyl-1-isoamylethylene oxide,
1-methyl-2-n-amylethylenet oxide,
1,1-dimethyl-2-isobutylethylene oxide,
n-hexylethylene oxide,
isohexylethylene oxide,
allylene oxide,
isoamylethylene oxide,
1-methyl-1-isobutylethylene oxide,
1,1-dimethyl-2-isopropylethylene oxide,
1-methyl-1-ethylethylene oxide,
n-amylethylene oxide,
1,2-dioctylethylene oxide,
tetradecylethylene oxide,
heptyleneethylene oxide,
phenylethylene oxide (styrene oxide),
sym. diphenylethylene oxide,
vinylethylene oxide, β-acetoxethylethylene oxide,
linaloolmonoxide,
cyclopentene oxide,
cyclohexene oxide, cyclooctene oxide,
dicyclopentadienyl monoxide,
benzalacetone oxide(β-acetylstyrene oxide),
β-benzoylstyrene oxide (chalkonoxide),
4-(2,3-epoxypropoxy-)-acetophenone,
3-(2,3-epoxypropoxy-)-ocetophenone,
4-(2,3-epoxypropoxy-)-propiophenone,
4-(2,3-epoxypropoxy-)-benzophenone,
1,2-epoxy-2-methyl-1-ethoxyl-1-phenylpropane,
1-o-nitrophenyl-2-benzoylethylene oxide,
3-methyl-2,3-epoxy-4-ketoheptene-5,
1-phenyl-2-anisoylethylene oxide,
epichlorohydrin,
3,3-dichloropropylene oxide,
3,3,3-trichloropropylene oxide,
3,3,3,1,1-pentachloropropylene oxide,
3-chloro-1,1,1-tribromo-propylene oxide,
β-chlorethylethylene oxide (4-chloro-1,2-butylene oxide),
1-α-chlorethyl-2-methylethylene oxide,
phenylchloromethylethylene oxide,
monobromoethylene oxide,
epibromohydrin,
1-bromomethyl-2-methylethylene oxide,
glycidmethylether,
β-bromoethylethylene oxide,
ethyleneglycolmonoglycide ether,
α,β-dibromoethylethylene oxide,
glycide-allylphenylether,
ethyleneglycol-monoglycide ether,
glycide-allylphenylether,
glycidic acid ethyl ester,
β-methyl-glycidic ethyl ester,
p-toluene sulfonic acid glycidylester,
glycidylphosphite ester,
p-toluene sulfonic acid glycidyl ester, α,β-dimethylglycidic acid nitrile,
epoxydated unsaturated fatty acid ester,
dimethylamino-2,3-epoxypropane,
monoacetylamino-2,3-epoxypropane,
N-anilino-2,3-epoxypropane,
N-pyrrole-2,3-epoxypropane,
1,1,2,2-tetracyanoethylene oxide,
N-phthalimide-2,3-epoxypropane,
N-trimethyl-ammonium-2,3-epoxypropane chloride,
glycide-thioethylether,
glycide-mercaptan, 1,2-epoxypropane-3-
 cyanthio ether, and
1,2,3,4-diepoxybutane (Erythrene dioxide).

The reaction in the first stage of the process is preferably carried out by placing the α-mercaptooxo compound together with the base into the reactor whereupon the oxirane is added dropwise while stirring and, if desired, upon cooling so as to obtain the reaction temperature within the above-stated range.

There is thus obtained an intermediate addition product from the α-mercaptooxo compound and the oxirane which has the following structure

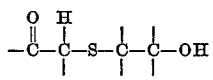

This intermediate product in most cases is obtained at such a high degree of purity that a separation and purification is not necessary. The product may therefore be directly passed into the cyclization operation, if desired, after distilling off the solvent.

The cyclization is preferably effected by heating in an organic solvent such as benzene, toluene, xylene, chloroform or carbon tetrachloride and in the presence of an acid catalyst such as p-toluene sulfonic acid, methane sulfonic acid, orthophosphoric acid, mineral acids, Lewis acids, acid salts such as alkali hydrogen sulfates or acid-exchange resins, molecular sieves while employing a water trap. It is also possible to effect the cyclization with an equimolar amount of anhydrous zinc chloride or phosphorus pentoxide in an inert organic solvent at room temperature.

The conversion of the 2,3-dihydro-p-oxathiins into the corresponding sulfones or sulfoxides, if such is desired can be carried out by subjecting the compound to an oxidizing agent such as $H_2O_2$, hydroperoxides, peracids, permanganate in acetic acid ester, acetone or, preferably, glacial acetic acid.

The following examples will further illustrate the invention.

The cyclization of the alkoxylated α-mercaptooxo compound when employing an acid catalyst may be carried out by heating the compound to a temperature of between 50 and 150° C., and preferably by adding the compound to a boiling solution of the acid catalyst in the inert solvent.

Example 1

Ethylene oxide was passed at room temperature into a solution of 23.6 g. (0.2 mole) 2-mercaptopentanone-(3) in 50 ml. methanol after adding 0.5 g. potassium hydroxide and upon vigorous stirring. A strongly exothermic reaction took place. By cooling with a water bath and adjusting the ethylene oxide current, the temperature of the reaction mixture was kept between 25 and 30° C. The introduction of ethylene oxide was continued until an exothermic reaction was no longer noticeable. Subsequently, stirring was continued at room temperature for another 30 minutes. After distilling off the solvent in a vacuum, the residue consisting of 2-(β-hydroxy-ethyl)-mercaptopentanone-(3) could be used directly for the condensation. The crude product was for this purpose added dropwise to a boiling solution of 2 g. of p-toluene sulfonic acid in 250 ml. toluene during 1 hour while stirring. After about 1.5 hours the condensation was complete. 3.6 ml. water were collected in a water trap. The reaction mixture was then cooled and washed with water. The solvent was distilled off in a vacuum. Fractionation of the residue in a vacuum furnished 26 g. of 2,3-dihydro-5-methyl-6-ethyl-p-oxathiin (90% of the theoretical value, related to the α-mercaptoketone used as starting product). The product was in the form of a colorless liquid having a boiling point of 44° C./1.5 mm. and $n_D^{20}$ 1.5132.

Example 2

33.5 g. (0.2 mole) of 1-phenyl-2-mercaptopropanone-(1) and ethylene oxide were treated at room temperature as described in Example 1. There were obtained 30.5 g. of 2,3-dihydro-5-methyl-6-phenyl-p-oxathiin (79.5% of the theoretical value relative to the α-mercapto ketone starting product). The product was in the form of a slightly yellow oil having a boiling point of 82° C./0.1 mm. and $n_D^{20}$ 1.6152.

Example 3

In this case 2-mercaptocyclohexanone-(1) was used in dimeric form as dihydroxydithiane. 26.0 g. (0.2 mole) of this compound were suspended in 100 ml. methanol. 0.5 g. of potassium hydroxide were then added and thereafter 14.5 g. (0.25 mole) of propylene oxide were added dropwise while stirring and cooling. The temperature of the reaction mixture was maintained between 25 and 30° C. After termination of the exothermic reaction, which resulted in a clear solution, the further treatment and condensation was effected as described in Example 1.

There were obtained 30 g. of 2-methyl-2,3-dihydro-5,6-tetramethylene-p-oxathiin (88% of the theoretical value) as a colorless liquid having a boiling point of 70.5° C./1.0 mm. and $n_D^{20}$ 1.5360.

Example 4

33.5 g. (0.2 mole) of 1-phenyl-2-mercaptopropanone-(1) and 23.2 g. (0.25 mole) of epichlorohydrin were processed as in Example 3. There were obtained 41 g. of 2-chloromethyl - 2,3 - dihydro - 5 - methyl - 6 - phenyl-p-oxathiin (85% of the theoretical value) as a yellow viscous liquid having a boiling point between 118 and 119° C./0.2 mm.

Example 5

By reacting 23.5 g. (0.2 mole) of 2-mercaptocyclopentanone-(1) with 24.7 g. (0.25 mole) of cyclohexene oxide as described in Example 3, there were obtained 31 g. of 2,3-tetramethylene - 2,3 - dihydro - 5,6 - trimethylene-p-oxathiin (79% of the theoretical value) corresponding to the 2,3-dihydro-p-oxathiin. The final product had a boiling point of 104–105° C./0.5 mm. The product solidified at room temperature.

Example 6

35.4 g. (0.3 mole) of 2-mercaptopentanone-(3) and 26.0 g. (0.35 mole) of 2,3-epoxypropanol (glycide) were reacted as described in Example 3 to give 37.5 g. of 2-hydroxymethyl - 2,3 - dihydro - 5 - methyl - 6 - ethyl-p-oxathiin (72% of the theoretical value). The product was in the form of a colorless liquid having a boiling point between 57 and 58° C./0.27 mm.

Example 7

35.4 g. (0.3 mole) of 2-mercaptopentanone-(3) and 26.5 g. (0.3 mole) of 1,2-epoxy-3-methoxypropane were reacted as described in Example 3. The product obtained was 42 g. of 2-methoxymethyl-2,3-dihydro-5-methyl-6-ethyl-p-oxathiin (75% of the theoretical value) in the form of a colorless liquid having a boiling point between 73 and 74° C./0.7 mm.

Example 8

35.4 g. (0.3 mole) of 2-mercaptopentanone-(3) and 45 g. (0.3 mole) of phenoxypropene oxide were reacted as described in Example 3. There were obtained 58.5 g. of 2 - phenoxymethyl - 2,3 - dihydro - 5 - methyl - 6 - ethyl-p-oxathiin (78% of the theoretical value) in the form of a slightly yellow viscous oil having a boiling point of 127 to 128° C./0.25 mm.

Example 9

35.4 g. (0.3 mole) of 2-mercaptopentanone-(3) and 35.5 g. (0.3 mole) of 1,2-epoxypropylethyl sulfide were reacted as described in Example 3. There were obtained 51 g. of 2,3-dihydro-5-methyl-6-ethyl-p-oxathiin-2-yl-methylethyl sulfide (78% of the theoretical value) in the form yl-ethyl sulfide (78% of the theoretical value) in the form of a slightly yellow oil of a boiling point of 90° C./0.9 mm.

Example 10

35.4 g. (0.3 mole) of 2-mercaptopentanone-(3) were reacted with 38.8 g. (0.3 mole) of 3-diethylamino-1,2-epoxypropane at room temperature as described in Example 3. To effect the condensation of the linear addition product, 0.3 mole of an 85%-conc. orthophosphoric acid were used. After cooling of the condensation mixture 12 g. (0.3 mole) of potassium hydroxide dissolved in 20 ml. water were added in order to separate the amine. The further treatment of the mixture was carried out as described in Example 3. There were obtained 47 g. of 2-diethylaminomethyl - 2,3 - dihydro - 5 - methyl - 6 - ethyl-p-oxathiin (68.5% of the theoretical value) in the form of a yellow oil having a boiling point of 121° C./0.23 mm.

Example 11

23.5 g. (0.2 mole) of 2-mercaptopentanone-(3) and 21 g. (0.2 mole) cyclopentene oxide were reacted as described in Example 3. There were obtained 26.5 g. of 2,3 - trimethylene - 2,3 - dihydro - 5 - methyl - 6 - ethyl-p-oxathiin (72% of the theoretical value) in the form of a colorless liquid having a boiling point of 58–59° C./0.25 mm.

Example 12

65.5 g. (0.5 mole) of 2-mercaptocyclohexanone-(1) and 49.5 g. (0.5 mole) of cyclohexene oxide were reacted as described in Example 3. There were obtained 46 g. of 2,3,5,6-bis-(tetramethylene)-2,3-dihydro-p-oxathiin (82% of the theoretical value) in the form of a colorless, viscous oil having a boiling point of 100.5° C./0.45 mm. The compound solidified at room temperature.

Example 13

23.5 g. (0.2 mole) of 2-mercaptopentanone-(3) and 23.2 g. (0.25 mole) of epichlorohydrin were reacted as described in Example 3. There were obtained 33.5 g. of 2 - chloromethyl - 2,3 - dihydro - 5 - methyl - 6 - ethyl-p-oxathiin (87% of the theoretical value) in the form of a colorless liquid of a boiling point between 60 and 61° C./0.1 mm.

Example 14

28.8 g. (0.2 mole) of 2,3-dihydro-5-methyl-6-ethyl-p-oxathiin were dissolved in a small amount of acetone and were slowly reacted at 0° C. with 23.5 g. (0.2 mole) of a 30% aqueous solution of hydrogen peroxide. After completion of the reaction the mass was heated to room temperature and about 200 ml. of an inert organic solvent were added. After washing of the organic phase and drying of $Na_2SO_4$, the solvent was removed in a vacuum. The thus-obtained residue was distilled in a vacuum. There were obtained 22.4 g. (70% of the theoretical value) of 2,3-dihydro-5-methyl-6-ethyl-p-oxathiin-oxide, $B.P._{0.1}$ 76° C.; $n_D^{20}$ 1.5272.

Example 15

19 g. (0.1 mole) of 2-chloromethyl-2,3-dihydro-5-methyl-6-ethyl-p-oxathiin were dissolved in about 50 ml. of glacial acetic acid and while cooling with ice, slowly reacted with 35.5 g. (0.3 mole) of a 30% aqpeous solution of hydrogen peroxide. The reaction temperature was not permitted to exceed 70° C. After completion of the strongly exothermic reaction heating was continued to 70° C. for another 2–3 hours. After cooling, the reaction mixture was concentrated in a rotary evaporator at a maximum temperature of 35° C. The residue which contained a high amount of peroxide was taken up in about 100 ml. ether. The ether phase was washed first with 2 N, NaOH and subsequently with water. After drying over $Na_2SO_4$ and evaporation of the ether, the corresponding sulfone was obtained at a high degree of purity ($B.P._{0.5}$ 155° C.). The yield was 13.9 g. (62% of the theoretical value).

Example 16

20.6 g. (0.1 mole) of 2,3-dihydro-2,5-dimethyl-6-phenyl-p-oxathiin were oxidized with hydrogen peroxide in glacial acetic acid. There were thus obtained 19 g. (80% of the theoretical value) of the corresponding sulfone ($B.P._{0.07}$ 150–152° C.). The details of the reaction and treatment were the same as described in Example 15.

Without further analysis the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. The process of making a 2,3-dihydro-p-oxathiin comprising the steps of reacting (A) an α-mercaptooxo compound having the formula

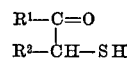

wherein $R^1$ and $R^2$ are the same or different and are hydrogen, alkyl of 1 to 18 carbon atoms or phenyl, or together form an alkylene chain of up to 10 carbon atoms, with (B) an oxirane having the formula

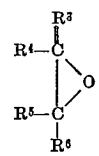

wherein $R^3$, $R^4$, $R^5$ and $R^6$ are the same or different and are hydrogen, alkyl of 1 to 18 carbon atoms which may be substituted by hydroxyl, chlorine, methoxy, phenoxy, ethylthio or diethylamino, or $R^3$ and $R^5$ or $R^4$ and $R^6$ may together form an alkylene chain of up to 10 carbon atoms in the presence of (C) an inert organic solvent and in the presence of (D) a base at a temperature between about 0 and 100° C., thereby forming an alkylated α-mercaptooxo compound having the formula

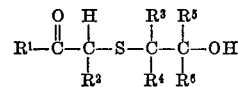

and then subjecting the latter compound to cyclization in the presence of an inert solvent and (E) an acid catalyst, or by reaction with an equimolar amount of anhydrous zinc chloride or phosphorus pentoxide in an inert organic solvent, so as to form the 2,3-dihydro-p-oxathiin, the base (D) being selected from the group consisting of alkali-metal hydroxides, alcoholates, carbonates, and bicarbonate,s tertiary amines, pyridine and quaternary nitrogen bases, and the acid catalyst (E) being selected from the group consisting of p-toluenesulfonic acid, methanesulfonic acid, orthophosphoric acid, mineral acids, Lewis acids, alkali metal hydrogen sulfates, acid-exchange resins and molecular sieves.

2. The process of claim 1, wherein the cyclization with the acid catalyst is effected upon application of heat of 50° to 150° C. or wherein the cyclization with the zinc chloride or phosphorus pentoxide is effected at room temperature.

3. The process of claim 1, wherein the reaction between the α-mercaptooxo compound and the oxirane is effected at a temperature between about 25 and 30° C.

4. The process of claim 1, wherein the alkoxylated α-mercaptooxo compound, prior to cyclization, is isolated and subjected to purification.

5. The process of claim 1, wherein the organic solvent employed in the reaction between the α-mercaptooxo compound and the oxirane is methanol.

6. The process of claim 1, wherein the said acid catalyst is p-toluene sulfonic acid.

7. The process of claim 1, wherein the α-mercaptooxo compound is selected from the group consisting of 2-mercaptopentanone-(3), 1-phenyl-2-mercaptopropanone-(1), 2-mercaptocyclohexanone-(1), and 2-mercaptocyclopentanone-(1).

8. The process of claim 1, wherein the oxirane is selected from the group consisting of ethylene oxide, propylene oxide, epichlorohydrin, cyclohexene oxide, 2,3-epoxypropanol, 1,2-epoxy-3-methoxypropane, phenoxypropene oxide, 1,2-epoxypropyl-ethyl sulfide, 3-diethyl-amino-1,2-epoxypropane and cyclopentene oxide.

9. The process of claim 1, wherein the 2,3-dihydro-p-oxathiin thus obtained is then oxidized to the corresponding sulfone or sulfoxide.

10. The process of claim 9, wherein the oxidation is effected with an aqueous solution of hydrogen peroxide or a solution of hydrogen peroxide in glacial acetic acid.

References Cited

UNITED STATES PATENTS 3,433,806   3/1969   Cavitt _____ 260—340.6

HENRY R. JILES, Primary Examiner

C. M. S. JAISLE, Assistant Examiner

U.S. Cl. X.R.

252—402, 406; 260—294.8 D, 326.5 SM